United States Patent [19]
Balser

[11] 3,889,533
[45] June 17, 1975

[54] ACOUSTIC WIND SENSOR
[75] Inventor: Martin Balser, Covina, Calif.
[73] Assignee: Xonics, Inc., Van Nuys, Calif.
[22] Filed: July 19, 1973
[21] Appl. No.: 380,897

[52] U.S. Cl.............. 73/189; 73/194 A; 340/1 R; 340/15
[51] Int. Cl............... G01w 1/06; G01s 9/66
[58] Field of Search ....... 73/189, 194 A, 67.6, 67.7, 73/170 R; 181/.5 T, .5 NP, .5 P; 340/5 S, 3 D, 1 R

[56] References Cited
UNITED STATES PATENTS

| | | | |
|---|---|---|---|
| 3,379,060 | 4/1968 | Pear | 73/189 |
| 3,448,613 | 6/1969 | Kastner et al. | 73/170 R |
| 3,671,927 | 6/1972 | Proudian et al. | 340/1 R |
| 3,675,191 | 7/1972 | McAllister | 340/1 R |

Primary Examiner—Richard C. Queisser
Assistant Examiner—Marcus S. Rasco
Attorney, Agent, or Firm—Harris, Kern, Wallen and Tinsley

[57] ABSTRACT

A system for remote and continuous measurement of wind velocity and direction. A system being an acoustic echo system or acoustic radar transmitter for directing acoustic energy to a zone, and one or more receivers for receiving acoustic energy scattered by wind in the zone, with each receiver output having a doppler frequency component varying as a function of wind velocity in the zone, with a signal processor having the receiver outputs as inputs for providing a processor output representing wind velocity.

14 Claims, 6 Drawing Figures

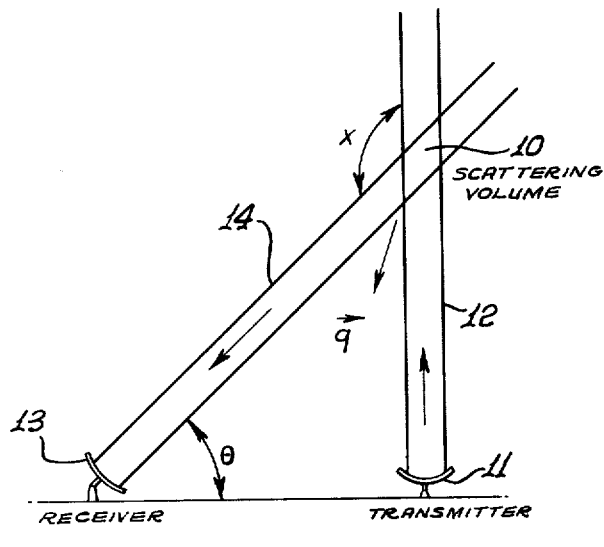
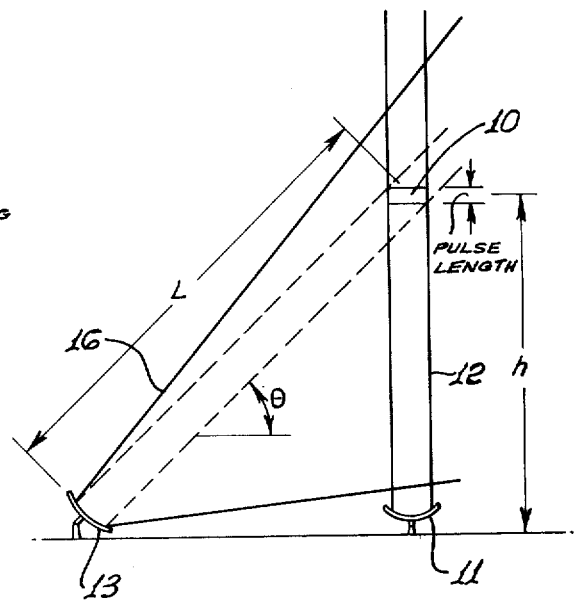
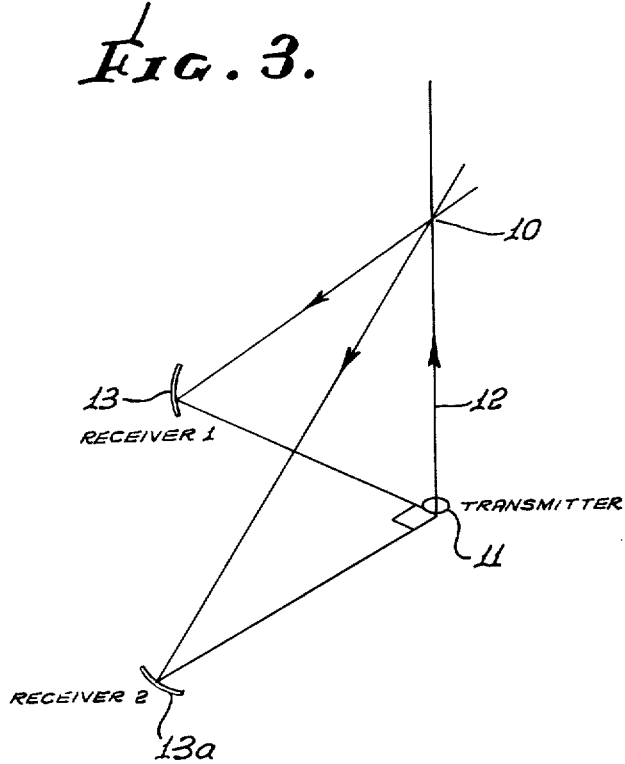
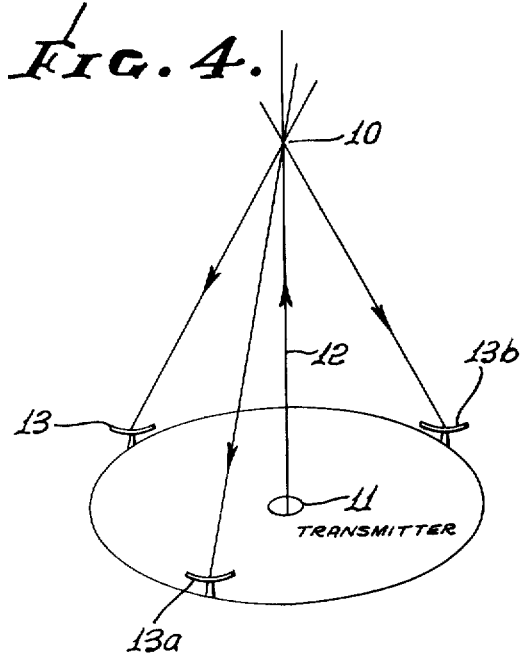

ACOUSTIC WIND SENSOR

This invention relates to a new and improved technique for the remote measurement of wind and wind profiles. Conventional measurement of winds is accomplished by cup anemometers and wind vanes. A number of more sophisticated devices have recently been introduced, but all share the property of being local probes, i.e., they measure the wind condition at the location of the instrument. This property restricts the wind measurement to the immediate vicinity of the ground, which is a severe limitation in altitude, or to a tower, which is still restricted in altitude and is in addition expensive and inflexible in location. Alternatively, the local probe may be mounted on an airborne platform, such as a balloon, or the motion of the platform itself may provide a measure of wind velocity. This approach is generally quite expensive both in material and in the personnel required to gather the data. In addition, the measurements are obtained only occasionally and are frequently subject to considerable variation in the location of the measurement due to a degree of unpredictability in the motion of the platform.

It is highly desirable to have an instrument capable of routinely and reliably providing measurements of wind velocities at altitudes where it would be impractical to measure them regularly or continuously with conventional devices. Acoustic doppler scattering offers just this capability; indeed, the principle of such remote measurement has been reduced to practice in two instrument configurations to be described in this specification.

The present invention incorporates an acoustic echo system, sometimes referred to as an acoustic radar, with the doppler component of the return signal providing a measure of wind velocity. The physical phenomenon upon which the present invention is based is well understood and documented, see for example McAllister, L. G., J. R. Pollard, A. R. Mahoney, and P. J. R. Shaw, "Acoustic Sounding — A New Approach to the Study of Atmospheric Structure," Proc. IEEE, Vol. 57, 579–587, 1969. In brief, small-scale fluctuations in temperature and velocity scatter energy out of an incident beam of acoustic waves. These fluctuations are carried along by the ambient wind, so that the scattered signal suffers a doppler shift corresponding to the wind velocity. Measurement of the doppler shift can be interpreted directly in terms of the wind velocity at the location of the scattering region.

Accordingly, it is an object of the present invention to provide a new and improved acoustic echo system including an acoustic transmitter, one or more receivers, and a signal processor for determining wind velocity at one or more zones. A further object is to provide such a system which will provide a substantially continuous indication of wind velocity and which will provide a measure of wind direction.

Other objects, advantages, features and results will more fully appear in the course of the following description. The drawings merely show and the description merely describes preferred embodiments of the present invention which I give in the way of illustration or example.

In the drawings:

FIG. 1 is a side view of a wind velocity measuring system illustrating one embodiment of the invention;

FIG. 2 is a view similar to that of FIG. 1 illustrating an alternative embodiment of the invention;

FIG. 3 is a view similar to that of FIGS. 1 and 2, illustrating another embodiment of the invention utilizing two receivers;

FIG. 4 is a view similar to that of FIG. 3 illustrating another embodiment of the invention utilizing three receivers;

Figure 5:
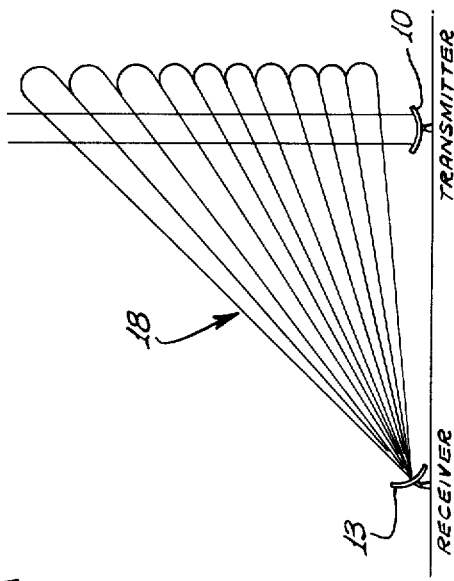
FIG. 5 is a view similar to that of FIG. 1 illustrating a receiver with an array of beams.

The basic system is illustrated in FIG. 1, which depicts the scattering geometry. The scattering volume or zone 10 is illuminated by the transmitting acoustic transducer or antenna 11 in a beam 12 which is shown as vertical. Other beam angles may be used if desired. Energy is scattered out of the beam and observed at the receiver 13. If the frequency of the transmitted wave is $f_o$, the received wave will have a frequency of $f_o + f_d$, with the doppler shift given by $$f_d = 2 \frac{v_q}{c} f_o \sin \chi/2 \qquad (1)$$

where $c$ is the velocity of sound, $\chi$ is the scattering angle, and $v_q$ is the component of the wind in the direction $\vec{q}$ along the bisector of the angle between the transmitter and receiver beams 12, 14. Equation 1 is the basic equation that shows the simple connection between the measured doppler shift and the wind component, wherein the other quantities are known geometrical and physical values. Minor modifications to equation 1 may be used to account for refractive effects in the propagation path, but the analysis presented here illustrates the system operation. Note that the doppler frequency is a signed quantity. The value of $f_d$ is positive, i.e., the returned frequency is higher than $f_o$, if the wind velocity vector is advancing along the vector $\vec{q}$, whereas $f_d$ is negative, i.e., the returned frequency is lower than $f_o$, if the wind velocity vector is receding along the vector $\vec{q}$.

In all of the embodiments illustrated, a single transmitting antenna is pointed straight up and illuminates a vertical column of air. Thus, the velocities, wind profiles and wind-shear measurements all refer consistently to the vertical column above the transmitting antenna.

Two basic receiving antenna patterns are illustrated in FIGS. 1 and 2, each associated with a transmitter modulation and a corresponding method of obtaining spatial resolution along the vertical column illuminated by the transmitter. In the FIG. 1 system, a continuous-wave (CW) signal is transmitted, so that all parts of the vertical column are illuminated at all times. Spatial resolution is therefore provided by the receiving antenna, which is constructed to have a narrow beam. For a given receiver beam, the scattering volume 10 is simply the intersection of the transmitter beam 12, which contains the illumination, and the receiver beam 14 that is being examined.

The system of FIG. 2 achieves spatial resolution by transmitting pulses. The receiving antenna for this case has a broad beam 16, covering the entire range of altitudes to be observed. At a given time, only one section or zone of the vertical column 12 is actually illuminated, that length being determined by the chosen pulse length. The pulse of acoustic energy from the transmitter propagates along the column with the speed of sound, and the return from a given altitude range can be recognized at the receiver by the time delay of the return after the transmission of the pulse. It is easily seen that the delay $\tau$ is given by $$\tau = \frac{1}{c}(h+L) = \frac{h}{c}\left(1 + \frac{1}{\sin\theta}\right) \quad (2)$$

FIGS. 1 and 2 illustrate the fundamental one-component element of a wind sensor. Most systems will utilize two or more receiving elements with a single vertical transmitter beam. A two-receiver system with receivers 13 and 13a is shown in FIGS. 3. In this configuration, it is assumed that the observed wind is horizontal. Thus two components suffice to determine the wind completely. The two receivers preferably are displaced in orthogonal directions from the transmitter, say one to the north or south, the other to the east or west. It is easily shown that the horizontal wind component in the plane of one of the two receivers is related to the measured doppler shift in that receiver by $$v_w = \frac{f_d}{f_o} \frac{c}{\cos\theta} \quad (3)$$

where $\theta$ is the elevation angle of the receiver beam. The only advantage of the two-component system over the more general three-component system to be described next is the saving in system costs, which may be attractive for some meteorological applications where vertical winds are not considered to be significant.

The three-receiver system is depicted in FIG. 4 with receivers 13, 13a and 13b. No assumption on wind direction is necessary for this case, since the three independent measurements completely determine the full wind vector. The three receivers preferably are situated 120° apart on the ground. We desire the three wind components $v_x, v_y, v_z$ where z is the vertical axis. If the three measured components (along the $q$ direction for each) are $v_1, v_2, v_3$, where it is assumed that receiver 1 (on which $v_1$ is measured) is located along the x-axis, it is then easily shown that $$v_x = \frac{1}{3\sin\phi}(2v_1 - v_2 - v_3)$$

$$v_y = \frac{1}{\sqrt{3}\sin\phi}(v_2 - v_3)$$

$$v_z = -\frac{1}{3}(v_1 + v_2 + v_3) \quad (4)$$

where $\phi = \pi/4 - \theta/2$ is the angle between $\vec{q}$ and the negative z-axis. Given the three doppler shifts, equations 1 and 4 show that it is a straightforward linear process to obtain from them the three desired orthogonal wind components.

The basic transmitter 11 may consist of an acoustic driver and horn at the focus of a paraboloid to produce the vertical beam. Should more power be desired, the transmitter can be replaced by an array of horns, each with its own driver. The array would typically contain 9 or 16 individual horns, all driven in phase to produce a uniform illumination across the aperture and thus produce a single narrow broadside beam. Frequencies from about 2kHz to 8kHz may be used depending on the application (greater range favors the lower frequencies, better velocity resolution the higher). In either case, the aperture may be surrounded by a shield designed to reduce sidelobe radiation to the receiver and minimize disturbance in the vicinity.

Different types of receiving antennas are used for the two different spatial resolution techniques. When the transmission is CW, spatial resolution is obtained with a narrow receiver beam. Two receiving antenna designs of the same basic type can be employed for CW operation that differ in the wealth of data provided and in the corresponding system complexity incurred. The simpler receiving antenna is a single-beam antenna similar to the transmitter antenna just described. Information as a function of altitude along the vertical transmitter beam is obtained by mechanically scanning the receiving antenna. The receiving antennas for multiple receiver systems are scanned in synchronism.

The more complex receiving antenna employs a fixed antenna with a vertical line of transducers in the focal plane. Each transducer produces a beam with the full resolution of the antenna, and the array 18 of such beams covers the desired region of the vertical transmitted beam. The configuration is depicted in FIG. 5. As with the transmitting antenna, a shield may be used to reduce the noise interference that limits the sensitivity of the system.

The pulsed transmission system of FIG. 2 requires an antenna that produces a fan beam which typically is ten times broader in elevation that it is in azimuth. Such an antenna can be implemented in two ways. In one, a row of horns can be constructed to provide the requisite 10 to 1 aperture, and ghe individual transducers combined in phase. The other employs a reflector in the form of a parabolic cylinder; the parabola is sufficient to produce the narrow azimuth angle, and the height of the cylinder is sufficient to reflect waves from the desired range of elevation angles to the transducer. These apertures may be appropriately shielded to reduce interference.

Two major advantages accrue to the CW approach over the pulsed approach. Since all altitudes are illuminated at all times, any given altitude (or in the more complex configuration, all the altitudes) can be studied continuously if desired. In contrast, the pulsed system samples a given interval or zone for a short time once each pulse repetition interval, which may be one to several seconds depending on the desired range. Thus short-term fluctuations in wind velocity can be measured by the CW technique. In addition, some advantage is obtained in performance from both the increased energy available from the CW operation and the greater gain of the narrowbeam receiving antennas.

The pulsed approach enjoys two advantages over the CW. It is difficult to eliminate entirely the directly received CW signal to zero doppler shift, which thus may interfere with measurements of wind at very low velocity. Capability to measure at such low velocity is insured by pulsed operation. Also, pulses maintain the same resolution at high altitude, whereas the resolution size defined by an antenna beamwidth increases with range. The dominating requirements of the specific wind-measuring application determine which of the approaches is more appropriate.

Figure 6:
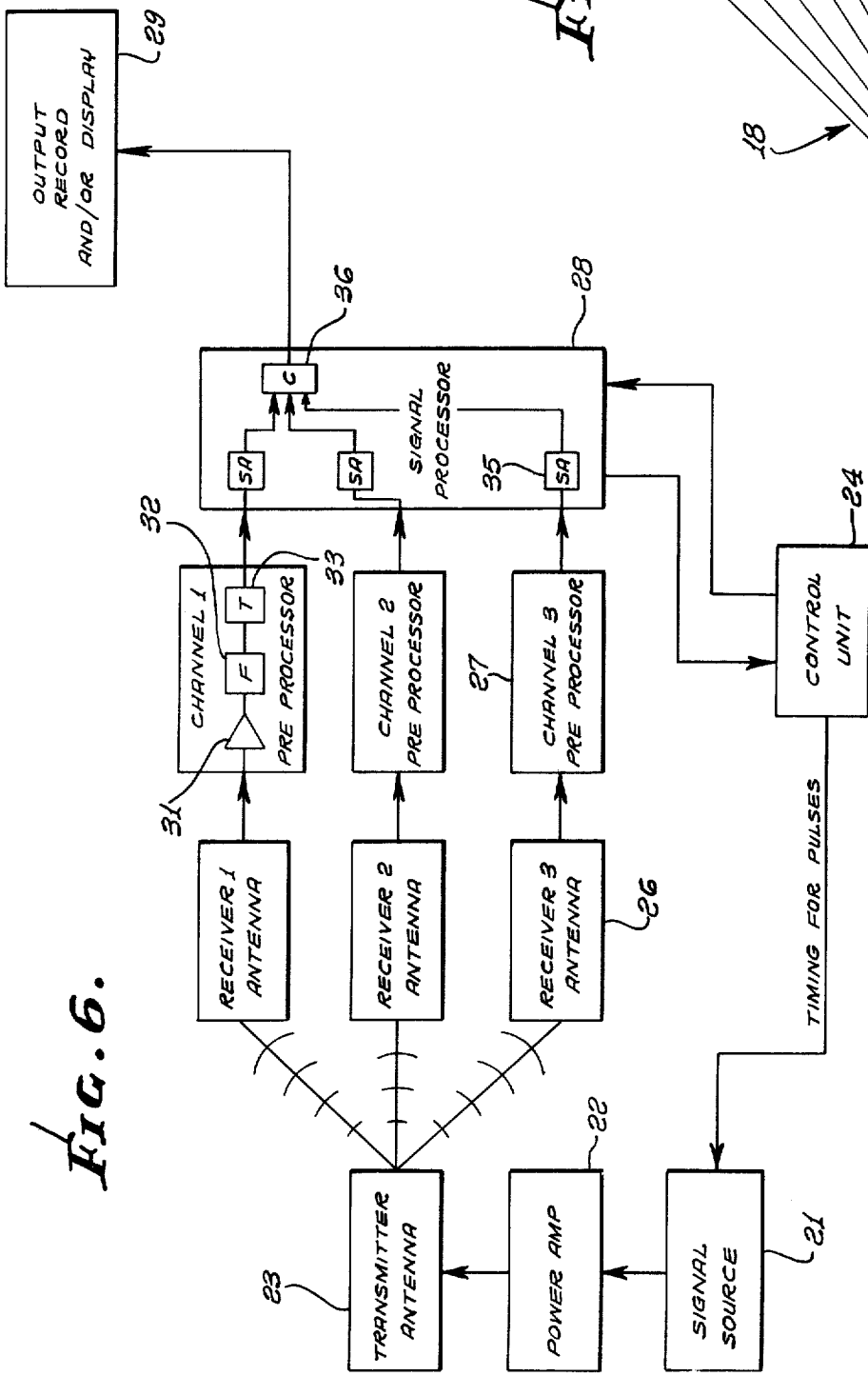
FIG. 6 is a block diagram illustrating transmitter, receiver and signal processor suitable for use with the system of the invention.

An overall system is illustrated in FIG. 6. The transmitter includes a signal source 21, power amplifier 22 and antenna or transducer 23. The signal from the source is amplified and trnasmitted into the vertical column 12. For CW operation, the signal source is essentially an oscillator, whereas for the pulsed operation, a plused modulator is incorporated, with timing controlled by a control unit 24 which also controls the signal processing cycle.

The receiver includes one or more antennae or transducers 26 and preprocessors 27, a signal processor 28 and an output record and/or display unit 29. Each preprocessor may include an amplifier 31, filter 32 and frequency translator 33. The signal processor 28 may include one or more spectrum analyzers 35 and a computation circuit 36.

The acoustic signals obtained from the three receiving antennas 26 after scattering in the atmosphere are preprocessed, i.e., the signals are amplified, filtered and translated in frequency so that they are appropriately prepared for processing. The signal processor 28 has three basic functions. The data are first spectrumanalyzed to allow the determination of the doppler frequency components. Second, a set of algorithms chooses the parameters to represent the mean wind, and if desired a measure of wind fluctuation. Finally, the results are formatted appropriately and fed to the output unit 29, which may be a display tube, teletypewriter, tape recorder or interface with a further processor such as a computer.

Vertical wind profiles may be measured by means of the acoustic radar configurations of the present invention. Both the CW and pulse systems share the feature that a vertical column of air is illuminated by a single transmitter beam and that the observation of a vector wind is accomplished by one or more receiving antennas displaced from the transmitter. The advantage of the single transmitter, plural receiver configuration is that all of the wind components for a given altitude are measured at the same point in space and thus truly represent an instantaneous measurement of a wind vector.

I claim:

1. In a system for measuring the wind velocity at a specific location, the combination of:
    an acoustic echo system transmitter for directing a beam of acoustic energy toward a zone spaced from said transmitter;
    a plurality of receivers for said transmitter and spaced from each other and from said transmitter, with each receiver directed toward said zone for receiving acoustic energy of said transmitter scattered by wind in said zone and providing a receiver output signal having a doppler frequency component; and
    signal processor means having the receiver output signals as inputs for generating a processor output signal varying as a function of the vector velocity of the wind in said zone.

2. A system as defined in claim 1 with first and second receivers equally spaced from said transmitter and located along perpendicular paths to said transmitter.

3. A system as defined in claim 1 with first, second and third receivers equally spaced from said transmitter and from each other.

4. A system as defined in claim 1 in which said acoustic echo system is a continuous wave system.

5. A system as defined in claim 1 in which said acoustic echo system is a pulse system.

6. A system as defined in claim 1 in which said acoustic echo system is a continuous wave system and said receiver includes a narrow beam acoustic transducer directed toward a segment of the path of the transmitter beam.

7. A system as defined in claim 1 in which said acoustic echo system is a continuous wave system and said receiver includes an array of narrow beam acoustic transducers each directed toward a segment of the path of the transmitter beam.

8. A system as defined in claim 1 in which said acoustic echo system is a pulse system and said receiver includes an acoustic transducer with a fan beam directed along the path of the transmitter beam.

9. A system as defined in claim 1 wherein said signal processor means includes a spectrum analyzer for determining said doppler frequency component.

10. A system as defined in claim 9 wherein said signal processor means includes a preprocessor stage incorporating an amplifier, a filter and a frequency translator.

11. In a system for measuring wind velocity at a plurality of different locations, the combination of:
    an acoustic echo system transmitter for directing a beam of acoustic energy toward a plurality of zones spaced from said transmitter along the path of said beam;
    a plurality of receivers for said transmitter, each spaced from said transmitter for receiving acoustic energy of said transmitter scattered by wind in each of said zones and each providing a receiver output signal having a doppler frequency component; and
    signal processor means having the receiver output signals as inputs for generating a processor output signal varying as a function of the vector velocity of the wind in each of said zones.

12. A system as defined in claim 11 with first and second receivers equally spaced from said transmitter and located along perpendicular paths to said transmitter.

13. A system as defined in claim 11 with first, second and third receivers equally spaced from said transmitter and from each other.

14. A system as defined in claim 11 wherein said signal processor means includes a spectrum analyzer for determining the doppler frequency component of each of said receiver output signals, and means for computing the mean wind velocity and direction and having the doppler frequency components and the transmitter and receiver positions as inputs.

* * * * *

UNITED STATES PATENT OFFICE
CERTIFICATE OF CORRECTION

Patent No. 3,889,533    Dated   June 17, 1975

Inventor(s) Martin Balser

It is certified that error appears in the above-identified patent and that said Letters Patent are hereby corrected as shown below:

Column 2, Line 29, correct "$V_9$" to -- $V_q$ --

Column 3, Eq. (2), correct to read:

$$\tau = \frac{1}{c}(h + L) = \frac{h}{c}\left(1 + \frac{1}{\sin \theta}\right) \qquad (2)$$

Column 4, Line 38, correct "ghe" to -- the --

Column 5, Line 9, correct "plused" to -- pulsed --

Column 5, Line 24, "spectruma-nalyzed" should be -- spectrum-analyzed --

Signed and Sealed this sixteenth Day of September 1975

[SEAL]

Attest:

RUTH C. MASON
Attesting Officer

C. MARSHALL DANN
Commissioner of Patents and Trademarks